United States Patent Office 3,480,567
Patented Nov. 25, 1969

3,480,567
POLYMERIZATION OF A VICINAL ALKYLENE OXIDE USING A NOVEL ORGANOMETALLIC COMPOUND-POLYOL COCATALYST
Yutaka Matsui, Ashiya, Norishige Hashimoto, Nishinomiya, and Noritoshi Mise, Higashinada-ku, Kobe, Japan, assignors to Takeda Chemical Industries, Ltd., Osaka, Japan
No Drawing. Filed May 23, 1962, Ser. No. 196,899
Int. Cl. C08g 23/06, 23/14
U.S. Cl. 260—2
13 Claims This invention relates to a method for preparing alkylene oxide polymers or copoylmers and more particularly to a new method characterized by preparing said polymers under the presence of a reaction product between lower alkyl metal and the compound having two or more hydroxyl group and/or mercapto group; in other words, this invention concerns an improvement in the production of alkylene oxide polymers by using novel catalysts as detailed below. Heretofore, it has well been known that alkylene oxides are polymerized under the presence of a single catalyst such as alumina, metal alkoxide, or the like, and moreover also the presence of a reaction product between organic metal compound and primary alcohol. Among others, there is also a method that an ethyl-Zn-tert-butoxide can be applied as the catalyst for alkylene oxide polymerization.

Generally speaking, the above-mentioned known methods, however, are not free from such defects that the large quantity of catalyst and a long time for the polymerization reaction are required, that the yield of the resulting polymers is low and that the procedure is complicated, and so the known methods are very inconvenient for an industrial production of such polymers. And moreover, the polymers obtained by such known methods are of low intrinsic viscosity.

In the case of the use of primary alcohol to be treated with an organic metal compound such as alkyl metal, the primary alcohol is inclined to become weak in its catalytic activity as carbon atoms increase in number, and therefore there is also a defect that the available alcohol must naturally be restricted. Judging confined from the above-mentioned reasons, it is asserted to be difficult to put the known methods to practical application covering a wide range.

As a result of the present inventors' study and investigation for excluding these defects from the known methods the present inventors found that reaction products between organic metal compounds represented by M(R)$n$, wherein M stands for Zn, Al or Sn, $n$ stands for an integer corresponding to the valence of M, and R stands for a lower alkyl group, and the compounds having two or more of hydroxyl group and/or mercapto group, such as polyhydric alcohol, polyhydric phenol, polyhydric thioalcohol, polyhydric thiophenol, has high catalytic activity for polymerization of alkylene oxides, and that polyalkylene oxide having higher polymerization degree than the polyalkylene oxides obtained by the known methods can easily and in better yield be obtained by using a small quantity of the present catalyst in a short reaction time, with the result of being able to put the obtained polyalkylene oxide to practical use covering a wide range. It was also found by the present inventors that the catalytic activity of the present catalyst is not subject to the influence of the number of carbon atoms of such a compound as polyhydric alcohol, polyhydric phenol, polyhydric thioalcohol or polyhydric thiophenol, and that the present catalyst is quite different from the known catalyst in which primary alcohol is used in its structure and the mechanism of the catalytic action.

Starting from the above findings, the present inventors studied furthermore and have accomplished the present invention.

It is an object of the present invention to provide a new polymerization method of alkylene oxides and another object is to provide new catalysts therefor. One of the starting materials of the present catalysts is lower alkyl metal representable by the following formula $$M(R)n$$

wherein M stands for Zn, Al or Sn, $n$ stands for an integer corresponding to the valence of M, and R stands for a lower alkyl group such as methyl, ethyl, propyl and butyl groups. The compounds to react with the above-mentioned organic metal compounds are those which in molecules have two or more of hydroxyl and/or mercapto groups such as polyhydric alcohol, polyhydric phenol, polyhydric thioalcohol, polyhydric thiophenol. Those can be used for the present invention irrespective of their straight chain, branched chain, or being saturated, unsaturated, saturated cyclo, monocyclic, polycyclic, or heterocyclic compounds, or the said compounds substituted by a suitable substituent or substituents. More concretely, there may be mentioned alkylenediols or alkylenedithiols such as ethylene glycol, propylene glycol, isopropylene glycol, butanediol, decandiol, ethandiol, dithio glycol and propylene dithiol, oxyalkylmercaptides such as oxyethylmercaptide and oxypropylmercaptide, polyalkylene glycols such as polyethylene glycol, polypropylene glycol, and polybutylene glycol, polyvinyl alcohol, partial hydrolyzate of polyvinyl acetate, glycerol, monoglyceridpentaerythritol, inositol, maltitol, sorbitol, lactitol, carbohydrates such as glucose, sorbose, lactose, maltitose, galactose, fructose, and sucrose, or the derivatives of said carbohydrates such as reduced derivatives, acetonized derivatives, acylated derivatives, esterified derivatives and O-alkyl derivatives, of aforesaid carbohydrates, catechol, resorcinol, bisphenol, hydroquinone, pyrogallol, dihydroxynaphthol, alizarine, dihydroxyethylpyridine, trihydroxyethylpyridine, trihydroxymethylaminomethane, dihydroxy-alkylamine such as dihydroxyethylamine and dihydroxymethylamine, trimethylolmelamine, condensate at an early stage of the condensation between phenol and formaldehyde, dioxydiphenylalkane such as dioxydiphenylmethane and dioxydiphenylpropane, silicon containing compounds such as dimethylsilandiol, and methylsilantriol.

Depending on the purpose, it may be suitably decided which of the two kinds of the above-mentioned materials to use. The reaction between the organic metal compounds and the compounds having two or more of hydroxyl group and mercapto group in the molecules, which are detailed above, is generally very violent and the reaction proceeds rapidly by merely mixing them. As the catalytic activity of reaction product varies somewhat with the mixing rate of both reactants, the rate of both reactants may suitably be decided complying with the purpose, but generally in the case of bivalent, trivalent and quadrivalent metal compounds, the amount of the two reactants to be allowed to react is preferably about 0.05–2, 0.05–4 and 0.05–6 moles respectively of the compounds having two or more of hydroxyl group and/or mercapto group in the molecule to one mole of the organic metal compound.

Although the chemical structure of the reaction product has not yet been clarified, it is supposed that the product has such a structure as the organic metal compounds having metal-oxygen bonding, metal-sulfur bonding or metal-carbon bonding as its principal structure, or the compound of complex structure which the compound having a hydroxyl or mercapto group bond to the aforesaid organic metal compound by coordination or condensation, or the like.

Among the reaction products, the compound having one or more metal-carbon bonding, metal-oxygen bonding or metal-sulfur bonding, and moreover having one or more hydroxyl or mercapto groups, has strong catalytic activity. And therefore in the present invention, it is preferable that such compounds are made to be comprised in the reaction product.

In case the temperature is too high by such means as heating in preparing the reaction product by mixing an alkyl metal compound and the compound having hydroxyl or mercapto group, the compound which has the above-mentioned strong catalytic activity, changes into the compound which the metal directly bonded with an oxygen atom or sulfur atom, and which has no metal-carbon bonding in the molecule and has only weak catalytic activity. From the aforesaid reason, it is preferred that alkyl metal compound and the compound having hydroxyl or mercapto group are allowed to react at room temperature or below.

In the method of the present invention, the above-mentioned reaction product may also be used in the state of the solution without any further treatments such as isolation of the metal compound etc. and/or purifying the same. In carrying the invention into practice, one kind or the mixture of two or more kinds of the above-mentioned reaction products may be conveniently used.

As to each of alkyl metal compound and the compound having hydroxyl or mercapto group to be treated with the said alkyl metal, one kind may often be used, but the mixture of two or more kinds of them may be applied similarly.

The present invention, as mentioned above, is carried out by polymerizing alkylene oxides under the presence of the reaction product between alkyl metal compound and the compound having hydronyl and/or mercapto groups.

As to the amount of the catalyst, about 0.01–1 percent by weight relative to alkylene oxide to be used is generally sufficient for the purpose of the present invention, though it may vary with the kinds of alkylene oxide. The polymerization reaction may be brought about at temperature of about −10∼200° C., preferably about 30∼120° C., though it may also vary with the kinds of alkylene oxide and catalyst.

The use of solvent is not always required for polymerizing alkylene oxide under the presence of a catalyst of the present invention, but the reaction may also be effected in suitable solvents such as benzene, alkyl-substituted benzenes e.g., various saturated hydrocarbons e.g., various ethers e.g., dioxane, tetrahydrofuran and the like. The reaction may be carried out under atmospheric or increased pressure.

Alkylene oxide of the starting material may be used in the gaseous or liquidous state in autoclave e.g. under increased pressure.

The reaction product between alkyl metal compound and the compound having hydroxyl and/or mercapto group, which is used as the catalyst, may beforehand be prepared, and may be added in the reaction system at suitable time in the course of polymerization reaction, or the alkyl metal and the compound having hydroxyl or mercapto group may be added to the reaction system either at one time or separately at the beginning of the reaction and the time of the addition may suitably be chosen in accordance with the purpose. In case polymerization reaction is very drastic, it is preferable to make the reaction mild by such means that the compound having hydroxyl or mercapto group is added dropwise to alkyl metal solution previously diluted with a suitable solvent.

As there is a fear of combustion in certain circumstances when an alkyl metal compound is brought into contact with air, it is preferable to prevent air from the reaction system by adopting such a proper means as replacing the air in the reaction vessel with inert gas e.g. nitrogen gas, carbon doixide gas, etc., particularly in case that alkyl metal compound and the compound having hydroxyl or mercapto group are separately added into the reaction system.

The present invention is characterized by using the above-mentioned catalyst for polymerization of alkylene oxide, and as to the concrete procedures of the polymerization reaction, the known procedures can suitably be adopted according to the purpose.

The polymerization reaction may be carried out by introducing a gaseous alkylene oxide under atmospheric pressure into a solution of the catalyst. On the other hand, the polymerization reaction may be carried out under incerased pressure by introducing the catalyst, a solvent and liquid alkylene oxide into an autoclave.

In order to isolate and purify the alkylene oxide polymer from the reaction mixture, any of known methods can be applied.

The alkylene oxides are the compounds in which one oxygen atom is combined with adjacent carbon atoms in a molecule. Examples of these compounds are ethylene oxide, propylene oxide, butylene oxide, styrene oxide, and butadiene monooxide.

When the polymerization reaction is carried out using two or more different alkylene oxides as starting materials, copolymers can also be obtained by adjusting the reaction conditions if so desired. The alkylene oxide and the amount thereof to be used depends on the product desired.

High-molecular weight polymers can be prepared easily, in good yield and in a very short period by the procss of the present invention using a very small amount of catalyst in comparison with known methods.

Furthermore, because only a small amount of the catalyst is necessary, the amount of ashes in the polymer obtained is very small, and therefore it is not necessary to separate the catalyst therefrom by centrifugal separation, filtration and drying. This is another advantage of the present invention.

The polyalkylene oxides obtained by the method of the present invention are of a high polymerization degree in comparison with the known polyalkylene oxides, that is to say, the intrinsic viscosity of the polymers obtained by the present invention runs into about 10–20.

Such high-molecular weight polyalkylene oxides by comparison with the low-molecular polyalkylene oxides hitherto known, find many uses, for example as fibers, cosmetics, medical supplies, industrial chemicals, packing materials as water soluble films as a thickener, size agent, binding agent, sedimentation accelerating agent or soil conditioner, because of their hard, strong, non-hygroscopic and water soluble properties.

Furthermore, polypropylene oxide and polybutylene oxide are water-insoluble, strong and elastic rubber-like materials, and are used as elastics, plastics, etc.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

part of zinc diethyl and corresponding amount of the compound having hydroxyl group or mercapto group, 100 parts of ethylene oxide is allowed to react and treated in the same way as Example 1 to obtain polymers mentioned in the following table.

TABLE

| Catalyst | Molar ratio of the compound having —OH or —SH relative to $Zn(C_2H_5)_2$ | Intrinsic viscosity |
| --- | --- | --- |
| $Zn-(C_2H_5)_2$-sucrose monopalmitate | 0.25 | 6.1 |
| $Zn-(C_2H_5)_2$-monopotassium alcoholate of sucrose mnoopalmitate | 0.25 | 4.8 |
| $Zn-(C_2H_5)_2$-sucrose | 0.25 | 3.3 |
| $Zn-(C_2H_5)_2$-glucose | 0.25 | 5.0 |
| $Zn-(C_2H_5)_2$-sorbitol | 0.25 | 9.0 |
| $Zn-(C_2H_5)_2$-sorbose | 0.25 | 5.2 |
| $Zn-(C_2H_5)_2$-diacetone sorbose | 0.25 | 3.5 |
| $Zn-(C_2H_5)_2$-pentaerythritol | 0.25 | 5.2 |
| $Zn-(C_2H_5)_2$-glycerol | 1 | 3.8 |
| $Zn-(C_2H_5)_2$-decanediol | 1 | 2.9 |
| $Zn-(C_2H_5)_2$-polyethylene glycol | 0.1 | 3.2 |
| $Zn-(C_2H_5)_2$-polypropylene glycol | 0.1 | 3.5 |
| $Zn-(C_2H_5)_2$-polyvinyl alcohol | 0.1 | 11.7 |
| $Zn-(C_2H_5)_2$-2,6-di-(hydroxyethyl) pyridine | 1 | 3.0 |
| $Zn-(C_2H_5)_2$-2,4,6-tri-(hydroxyethyl) pyridine | 1 | 3.0 |
| $Zn-(C_2H_5)_2$-tri-(hydroxymethyl) aminomethane | 1 | 2.8 |
| $Zn-(C_2H_5)_2$-dimethylsilane diol | 1 | 5.8 |
| $Zn-(C_2H_5)_2$-methylsilane triol | 1 | 6.5 |
| $Zn-(C_2H_5)_2$-silicone | 0.1 | 2.8 |
| $Zn-(C_2H_5)_2$-catecol | 1 | 3.0 |
| $Zn-(C_2H_5)_2$-resorcinol | 1 | 2.8 |
| $Zn-(C_2H_5)_2$-hydroquinone | 1 | 3.5 |
| $Zn-(C_2H_5)_2$-pyrogallol | 1 | 3.1 |
| $Zn-(C_2H_5)_2$-inositol | 1 | 1.8 |
| $Zn-(C_2H_5)_2$-dihydroxynaphthol | 1 | 4.0 |
| $Zn-(C_2H_5)_2$-ethane diol | 1 | 3.2 |
| $Zn-(C_2H_5)_2$-thio glycol | 1 | 2.1 |
| $Zn-(C_2H_5)_2$-alizarine | 1 | 1.8 |

In the following examples, the relation between part by weight and part by volume is the same as that between gram and milliliter.

EXAMPLE 1

0.2 part of zinc diethyl dissolved in 10 parts of benzene was placed in a pressure bottle in which the air had been replaced with nitrogen gas, then 0.4 part of sucrose dipalmitate was added thereto and the mixture was well admixed.

After the compounds in the bottle were allowed to react with each other while cooling in the stream of nitrogen gas, 20 parts of ethylene oxide were further added, and the bottle was closed, being left standing for 48 hours at room temperature.

On completion of the reaction, the resulting solidified crystalline polymer was taken out and the catalyst used was decomposed by adding a large amount of water-methanol solution. The yield of the polymer was 20 parts and its intrinsic viscosity was 18.2 measured in its aqueous solution of 30° C.

EXAMPLE 2

10 parts of benzene, 0.2 part of zinc diethyl, 0.15 part of ethylene glycol and 20 parts of ethylene oxide were placed while cooling in a pressure bottle in which the air had been replaced with nitrogen gas, followed by allowing the mixture to react with each other under agitation for 48 hours at room temperature. The product was separated in the same way as Example 1 to obtain 20 parts of white crystalline polymer having its intrinsic viscosity as 8.8 measured in its aqueous solution at 30° C.

EXAMPLE 3

10 parts of benzene, 0.2 part of zinc diethyl, 0.2 part of butane diol and 20 parts of ethylene oxide were treated as in a similar manner to Example 2 to obtain 20 parts of white crystalline polymer having its intrinsic viscosity as 11.0 measured in its aqueous solution at 30° C.

EXAMPLE 4

Under the presence of the reaction product between 1

EXAMPLE 5

0.2 part of zinc diethyl dissolved in 50 parts of benzene was placed into a pressure bottle in which the air had been replaced with nitrogen. To the mixture 0.1 part of butane diol-1,3 dissolved in 1.5 parts of tetrahydrofuran was further added while cooling. On completion of the reaction 20 parts of ethylene oxide was further added, then the bottle was closed and heated at 70° C. for 2 hours, whereby 20 parts of polymer having its intrinsic viscosity as 7.0 were obtained.

EXAMPLE 6

0.2 part of aluminum triethyl dissolved in 5 parts of benzene was placed in a pressure bottle in which the air had been replaced with nitrogen gas, then 0.6 part of sucrose dipalmitate was added thereto and the mixture was admixed.

After the compounds in the bottle were allowed to react with each other while cooling in the stream of nitrogen gas, 20 parts of ethylene oxide were further added, and the bottle was closed, being left standing for 48 hours at room temperature.

On completion of the reaction, the resulting solidified crystalline polymer was taken out and the catalyst used was decomposed by adding a large amount of water-methanol solution. The yield of the polymer was 20 parts and its intrinsic viscosity was 13.0 measured in its aqueous solution at 30° C.

EXAMPLE 7

10 parts of benzene, 0.2 part of zinc diisobutyl, 0.2 part of butane diol and 20 parts of ethylene oxide were treated as in a similar manner to Example 6 to obtain 20 parts of white crystalline polymer having its intrinsic viscosity as 8.5 measured in its aqueous solution at 30° C.

EXAMPLE 8

5 parts of benzene, 0.2 part of tin tetraethyl and 0.3 part of butane diol was placed in a pressure bottle in which the air had been replaced with nitrogen gas, then 20 parts of ethylene oxide was added thereto, and the bottle was closed and heated at 80° C. for 10 hours under agitation.

On completion of the reaction, the resulting solidified crystalline polymer was taken out and the catalyst used was decomposed by adding a large amount of water-methanol solution, and dried. The yield of the polymer was 20 parts and its intrinsic viscosity was 2.9 measured in its aqueous solution at 30° C.

What is claimed is:

1. A catalyst for the polymerization of vicinal alkylene oxides which is the product of the reaction in an inert gas, in the presence of a suitable solvent, and, at a temperature which is maximally ambient, of di(lower) alkyl zinc with polyhydric thioalcohol free of interfering functional groups, the latter being present in an amount of about 0.05 to 2 moles per mole of dialkyl zinc.

2. A catalyst for the polymerization of vicinal alkylene oxides which is the product of the reaction of an inert gas, in the presence of a suitable solvent, and, at a temperature which is maximally ambient, of $Zn(C_2H_5)_2$ and ethylene glycol, the latter being present in an amount of about 0.05 to 2 moles per mole of diethyl zinc.

3. A catalyst for the polymerization of vicinal alkylene oxides which is the product of the reaction in an inert gas, in the presence of a suitable solvent, and, at a temperature which is maximally ambient, of $Zn(C_2H_5)_2$ and sucrose monopalmitate, the latter being present in an amount of about 0.05 to 2 moles per mole of diethyl zinc.

4. A catalyst for the polymerization of vicinal alkylene oxides which is the product of the reaction in an inert gas, in the presence of a suitable solvent, and, at a temperature which is maximally ambient, of $Zn(C_2H_5)_2$ and sorbitol, the latter being present in an amount of about 0.05 to 2 moles per mole of diethyl zinc.

5. A catalyst for the polymerization of vicinal alkylene oxides which is the product of the reaction in an inert gas, in the presence of a suitable solvent, and, at a temperature which is maximally ambient, of $Zn(C_2H_5)^2$ and sucrose dipalmitate, the latter being present in an amount of about 0.05 to 2 moles per mole of diethyl zinc.

6. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of a di(lower alkyl) zinc having the formula:

$$Zn(R)_2$$

wherein R stands for a lower alkyl selected from the group consisting of methyl, ethyl, propyl and butyl with a member selected from the group consisting of polyhydric thioalcohol free of interfering functional groups, ethylene glycol, sorbitol, sucrose monopalmitate, sucrose dipalmitate, said member being present in an amount of about 0.05 to 2 moles per mole of dialkyl zinc.

7. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of a di(lower alkyl) zinc having the formula:

$$Zn(R)_2$$

wherein R stands for a lower alkyl selected from the group consisting of methyl, ethyl, propyl and butyl with sucrose monopalmitate, the latter being present in an amount of about 0.05 to 2 moles per mole of dialkyl zinc.

8. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of a di(lower alkyl) zinc having the formula:

$$Zn(R)_2$$

wherein R stands for a lower alkyl selected from the group consisting of methyl, ethyl, propyl and butyl with sucrose dipalmitate, the latter being present in an amount of about 0.05 to 2 moles per mole of dialkyl zinc.

9. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of diethyl zinc with polyhydric thioalcohol free of interfering functional groups, the latter being present in an amount of about 0.05 to 2 moles per mole of diethyl zinc.

10. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of diethyl zinc with ethylene glycol, the latter being present in an amount of about 0.05 to 2 moles per mole of diethyl zinc.

11. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of diethyl zinc with sorbitol, the latter being present in an amount of about 0.05 to 2 moles per mole of diethyl zinc.

12. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the reaction of diethyl zinc with sucrose monopalmitate, the latter being present in an amount of about 0.05 to 2 moles per mole of diethyl zinc.

13. A method for polymerizing vicinal alkylene oxides, which comprises contacting under polymerizing conditions a monomeric vicinal alkylene oxide free of interfering functional groups with about 0.01 to 1 percent by weight, relative to said alkylene oxide, of a polymerization catalyst consisting of the product of the reaction of diethyl zinc with sucrose dipalmitate, the latter being present in an amount of about 0.05 to 2 moles per mole of diethyl zinc.

References Cited

UNITED STATES PATENTS

| | | | |
|---|---|---|---|
| 3,058,923 | 10/1962 | Kutner | 260—2 |
| 3,398,119 | 8/1968 | Garty et al. | |

FOREIGN PATENTS

| | | |
|---|---|---|
| 223,534 | 8/1959 | Australia. |

OTHER REFERENCES

Whitmore "Organic Chemistry" Sec. edition, May 1951, pp. 854–855.

Furukawa et al., "Die Makramolekuare Chemie," vol. XXXII (1959), pp. 90–94.

Vandenberg "Journal of Polymer Science" vol. XLVII Issue 149, (1960) pp. 486–488.

WILLIAM H. SHORT, Primary Examiner

T. PERTILLA, Assistant Examiner

U.S. Cl. X.R.

252—431; 260—88.3

PO-1050
(5/69)

UNITED STATES PATENT OFFICE
CERTIFICATE OF CORRECTION

Patent No. 3,480,567          Dated November 25, 1969

Inventor(s) Yutaka Matsui, Norishige Hashimoto & Noritoshi Mise

It is certified that error appears in the above-identified patent and that said Letters Patent are hereby corrected as shown below:

In the heading of the Patent, insert:
--Claims priority, application Japan, June 2, 1961,
        19713/1961--

SIGNED AND
SEALED
APR 14 1970

(SEAL)
Attest:

Edward M. Fletcher, Jr.
Attesting Officer

WILLIAM E. SCHUYLER, JR.
Commissioner of Patents